(No Model.)
F. GRANT & L. VELTEN.
FERRULE FOR WHIPS AND METHOD OF MAKING THE SAME.
No. 469,897. Patented Mar. 1, 1892.
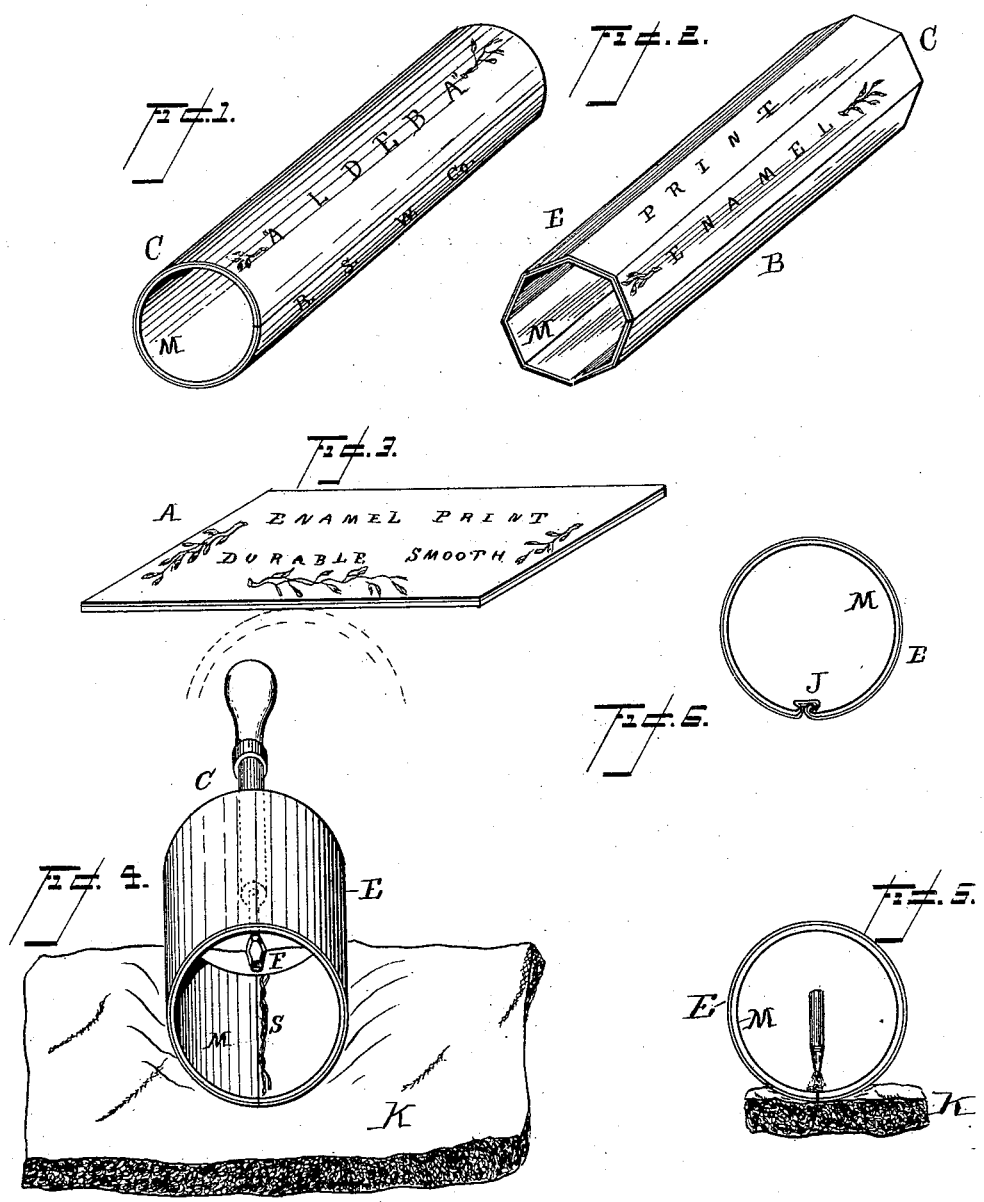

UNITED STATES PATENT OFFICE.

FRANK GRANT AND LUDWIG VELTEN, OF WESTFIELD, MASSACHUSETTS.

FERRULE FOR WHIPS AND METHOD OF MAKING THE SAME.

SPECIFICATION forming part of Letters Patent No. 469,897, dated March 1, 1892.

Application filed November 18, 1891. Serial No. 412,269. (No model.)

*To all whom it may concern:*

Be it known that we, FRANK GRANT and LUDWIG VELTEN, residing at Westfield, in the county of Hampden and State of Massachusetts, have invented certain new and useful Improvements in Ferrules for Whips and Methods of Making the Same, of which the following is a specification, reference being had therein to the accompanying drawings.

This invention relates to ferrules for whips and similar objects and the method of making the same.

The object of the invention is to produce a ferrule or similar article, especially a whip-ferrule, having a metallic base and an enameled and, if desirable, a printed or ornamented surface, and without a turned-in or overlapping seam.

We will briefly set forth the state of the art as known to us.

Metallic ferrules made with a lap or butt weld or brazed or soldered for use on whips are, of course, well known. Such have sometimes been painted or lacquered after the ferrule is made; but such cannot have the smooth finish of our labels, nor can they be printed after the ferrule is made. Boxes and like receptacles have been made from enameled metal, (usually tinned iron,) in which the metal was enameled and lithograph-printed in flat sheets, and the sheets then bent into boxes, the edges being united by a turned-in seam; but prior to our invention it has been considered impossible to unite the edges of such boxes by soldering or brazing, for the reason that the heat used in soldering defaced the enamel near the joint. This difficulty we have overcome, and are now able to produce a printed enameled ferrule, the metallic base of which is united by a lap or butt and brazed or soldered joint, without injury to the enamel, and the method by which this is done we will now proceed to explain, referring to the drawings, in which—

Figure 1 is a perspective of one of our ferrules, of cylindrical form. Fig. 2 is a similar view of an octagonal ferrule. Fig. 3 is a perspective of a flat piece of metal, enameled and printed, as used for the body of a label. Fig. 4 is a perspective view of one of the ferrules in position for soldering, showing a soldering-iron and protection-cushion. Fig. 5 is an end view of a ferrule in position for soldering, showing part of a blow-pipe or gas-flame, which may be used for melting the solder. Fig. 6 is an end view of a box-body with seam-joint, as heretofore made.

A blank A, of enameled tin-plate, having a label, trade-mark, or ornamenal surface lithographed or printed thereon, is cut to the proper size to form a ferrule. This blank is then bent to form a ferrule, the edges abutting, as in Figs. 1, 2, 4, and 5. The enameled surface will be outward in the ferrule. The ferrule may be polygonal, as at B, or cylindrical, as at C. The metal M is usually of such stiffness that it will retain its form temporarily when bent to form. The joint is placed on a wet cushion K, Fig. 4, or a yielding or other surface which is kept cool may answer the purpose. A line of solder S along the joint on the inside of the ferrule is then melted by rapid application of a soldering-tool F, or flame of blow-pipe and the solder will flow into and firmly unite the joint. The enameled face is protected by the wet or cold cushion K, so that the outer surface of the ferrule shows but little of the joint, and there is no turned-in seam, as at J, Fig. 6, in the box-bodies heretofore made.

The ferrule when constructed as described is ready for application to a whip or other article. The enameled surface we prefer to have printed as a label to indicate quality, ownership, or production; but it may bear a trade-mark or merely ornamental designs in enamel-printing.

A label so made becomes practically indestructible during the life-time of a whip. The surface being smooth is more agreeable to the touch than a plain metallic ferrule, and may be made much more ornamental than any known ferrule of like cost. The enameled surface of the ferrule is also a non-conductor of heat to a considerable extent, and so less objectionable to handle when used as a socket-guard.

It will be understood that the soldering or brazing may be done with any tools or materials common for such work.

The improvement in soldering consists in protecting the enameled surface of the ferrule by a wet or cold substance or surface while the joint is united.

As there is no waste of material where a butt-joint is made, there is considerable economy of material by this soldered joint over a turned-in seam-joint. The perfection of finish of the soldered joint over the turned-in or lap seam is very great.

It is well known to those familiar with the lithographic art that such an object as a completed ferrule or box body cannot be printed on any known lithographic press, and only temporary and very rough and inferior printing can be done on such article by rubber stamps and the like and at considerable expense, and, as has been explained, the turned-in seam heretofore used on boxes and the like is very objectionable for ferrules, because with it the ferrule is held away from the whip at each side of the seam, thus preventing a close fit and making the ferrule unsightly and rough to handle. Such a lap-seam ferrule would also admit dirt and moisture between the ferrule and whip-body near the seam, tending to injure the whip.

By our process the label or ornamental printing on the face of the enameled metal can be applied to sheets of any convenient size for printing, and the sheets afterward cut to proper size to form the ferrules.

The principal use of these ferrules is to form a permanent label for whips; but incidentally the ferrule may be used as a wear-plate or socket-guard and as an ornamental finish, and, as has been stated, the ferrule so constructed is more comfortable to handle than anything heretofore known.

What we claim is—

1. The method of making ferrules and the like from enameled sheet metal, which consists in bending the blanks to proper shape with their edges adjoining, protecting the enameled face at the joint by a cooling or heat-conducting material, and soldering or brazing the joint which is so protected.

2. The soldered or brazed ferrule having a smooth, printed, and enameled surface, substantially as described.

In testimony whereof we affix our signatures in presence of two witnesses.

FRANK GRANT.
LUDWIG VELTEN.

Witnesses:
HOMER B. STEVENS,
WM. F. THAYER.